L. COWART.
ROTARY HARROW.
APPLICATION FILED JULY 19, 1912.
1,051,199.
Patented Jan. 21, 1913.
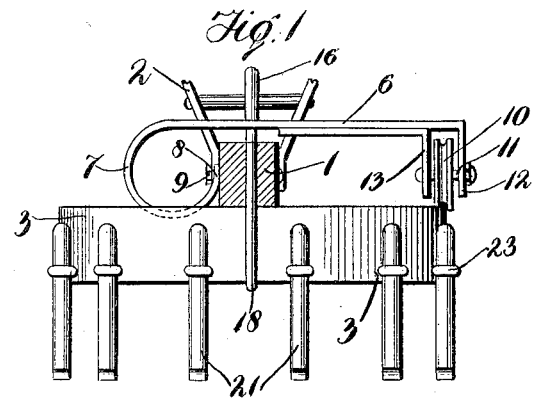
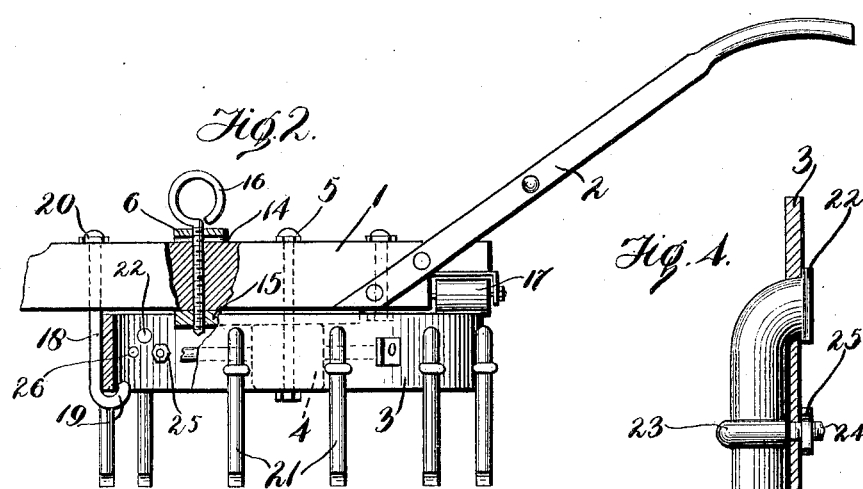
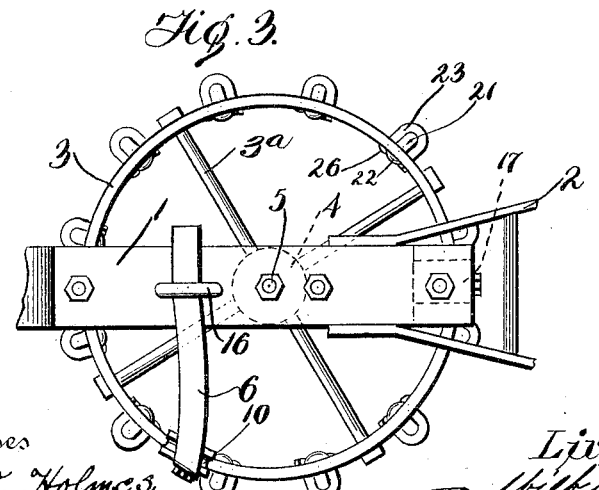
Witnesses
Oliver W. Holmes
H. H. Byrne
Inventor
Lively Cowart,
By Wilkinson, Witherspoon
Mackay
Attorneys

UNITED STATES PATENT OFFICE.

LIVELY COWART, OF PICNIC, FLORIDA, ASSIGNOR OF ONE-HALF TO F. M. CARTER, OF PICNIC, FLORIDA.

ROTARY HARROW.

1,051,199. Specification of Letters Patent. Patented Jan. 21, 1913.

Application filed July 19, 1912. Serial No. 710,526.

*To all whom it may concern:*

Be it known that I, LIVELY COWART, a citizen of the United States, residing at Picnic, in the county of Hillsboro and State of Florida, have invented certain new and useful Improvements in Rotary Harrows; and I do hereby declare the following to be a full, clear, and exact description of the invention, such as will enable others skilled in the art to which it appertains to make and use the same.

The present invention relates to harrows of the horizontal rotary type, and has for its purpose to provide a cultivator of that character having a resilient and adjustably mounted pressure device for the rotatable tooth holder, which will permit of said part being set for most effectively working the ground as the condition thereof requires; and wherein said rotary part may readily conform with any uneven surface of the ground passed over.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—Figure 1 is a front elevational view of the harrow with the draft bar thereof in section; Fig. 2 is a side elevational view of the harrow, with parts in section; Fig. 3 is a top plan view thereof; and Fig. 4 is a detail view of one of the harrow teeth, and showing its manner of fastening.

Referring to the construction in detail, 1 designates the ordinary draft bar having the usual handles 2 for the driver; and 3 is the horizontally disposed wheel, whose hub 4 is pivotally mounted on the draft bar 1 through the medium of a bolt 5. The means for depressing the wheel on one side of the draft bar 1, whereby to effect rotation of the harrow as it is drawn over the ground, consist of an arm 6 constructed of resilient metal and having a looped portion 7, whose end 8 is secured to one side of the draft bar 1 through the medium of a suitable bolt, or bolts, 9. On its free end, the arm 6 carries a grooved roller 10, that is journaled on a shaft 11 mounted between the arm end 12 and a downward extension of an angle bar 13, that is secured to said arm 6 in substantially that manner shown in Fig. 1. The arm 6 is adapted to have the roller 10 thereof held against the rim of the wheel 3 under different degrees of tension, and to which end a screw bolt 14 passes through the draft bar 1 and has threaded engagement with a plate 15, that is secured to the underside of said draft bar in preferably that manner shown in Fig. 2. Said bolt 14 has the end thereof constructed with a ring, or eye, 16 whereby a bar of any character having the required strength may be inserted therethrough and by turning adjust said screw bolt and depress the arm 6, or permit the same to be lifted under its own resiliency. At the rear end of the draft bar 1 is journaled a smooth roller 17 which contacts with the upper edge of the wheel rim 3 and holds the rear end of said wheel stable during the rotation thereof, as in ordinary harrows of this general character.

This invention contemplates the use of a harrow having stationary, or non-revoluble, teeth, and to that end a bolt 18 is secured to the draft bar 1, at the fore end of said wheel and has a hooked end 19 which engages with the wheel rim in that manner shown in Fig. 2, and which, through the tightening of the nut 20, effects to hold said wheel against rotation as will be readily understood. It will be clear, of course, that when the wheel is held against rotation in the manner just described, the tension on the roller carrying arm 6 would be relieved. The harrow teeth 21 consist each of a spike, which passes through the rim of the wheel 3, and is thence disposed against said rim and downwardly for approximately that distance shown in Fig. 4. The inner end of the spike is upset against the inner surface of the wheel rim 3 in that manner indicated by 22 in Fig. 4. The tooth securing means consist of a bolt 23 which passes through said wheel rim and thence around the tooth and again through the wheel rim, and has its screw-threaded end 24 secured through the medium of a nut 25 which binds against the inner surface of the rim. The end 26 of said bolt is upset against the inner surface of the wheel rim as with the end 22 of the tooth. The resilient arm 6 is adapted to be moved to either side of the draft bar whereby the toothed wheel may be depressed on one side or the other, as occasion requires. The toothed wheel is also adapted for revolving in either direction, as when caught by grass, roots, or other obstructions. The spokes 3ª of the wheel are screwed into both the hub and the rim of the wheel whereby one hub may serve for different sized wheels. The bolt which holds the tooth to the rim of the wheel requires but one nut, and is removable, thus allowing different sized teeth to be placed in the same harrow.

It is obvious that those skilled in the art may vary the details of construction and arrangement of parts without departing from the spirit of my invention, and therefore I do not wish to be limited to such features except as may be required by the claims.

What I claim is:—

1. In a harrow, the combination of a draft bar; a horizontally disposed toothed wheel mounted to rotate on said draft bar; a resilient arm secured at one end to said draft bar; a roller journaled on said arm at the other end thereof and adapted to engage with said toothed wheel; and a bolt engaging with said resilient arm and adjustably mounted on said draft bar for regulating the degree of pressure of said roller on said toothed wheel, substantially as described.

2. In a harrow, the combination of a draft bar; a horizontally disposed toothed wheel mounted to rotate on said draft bar; a resilient arm passing over said draft bar and having a looped portion with the end thereof secured against said draft bar on one side thereof; a roller journaled on the free end of said resilient arm and adapted to engage with the rim of said toothed wheel; a screw bolt adjustably mounted on said draft bar and engaging with said resilient arm whereby said roller may be held under varying tension against said toothed wheel; and a bolt mounted on said draft bar adapted to engage with and hold said toothed wheel against rotation, substantially as described.

In testimony whereof, I affix my signature, in presence of two witnesses.

LIVELY COWART.

Witnesses:
 CLAYTON LASTINGER,
 M. E. COWART.

---

Copies of this patent may be obtained for five cents each, by addressing the "Commissioner of Patents, Washington, D. C."